United States Patent
Vitoorapakorn

(10) Patent No.: US 6,460,576 B2
(45) Date of Patent: Oct. 8, 2002

(54) PIPE INSULATION JACKET

(75) Inventor: Pawat Vitoorapakorn, Samutprakarn (TH)

(73) Assignee: Aeroflex International Co., Ltd., Samutprakarn (TH)

( * ) Notice: Subject to any disclaimer, the term of this patent is extended or adjusted under 35 U.S.C. 154(b) by 0 days.

(21) Appl. No.: 09/927,037

(22) Filed: Aug. 9, 2001

(65) Prior Publication Data

US 2002/0092577 A1 Jul. 18, 2002

(30) Foreign Application Priority Data

Jan. 12, 2001 (EP) .............................................. 01810031

(51) Int. Cl.$^7$ ................................................. F16L 9/14
(52) U.S. Cl. ........................ 138/149; 138/156; 138/151; 138/DIG. 1
(58) Field of Search ................................. 138/151, 156, 138/149, DIG. 1

(56) References Cited

U.S. PATENT DOCUMENTS

| | | | | | |
|---|---|---|---|---|---|
| 312,037 | A | * | 2/1885 | Suhr | 106/701 |
| 527,867 | A | * | 10/1894 | Manville | 138/141 |
| 3,614,967 | A | * | 10/1971 | Royston | 138/141 |
| 4,022,248 | A | * | 5/1977 | Hepner et al. | 138/141 |
| 4,213,487 | A | * | 7/1980 | Funk et al. | 138/143 |
| 4,243,453 | A | * | 1/1981 | McClintock | 138/149 |
| 4,772,507 | A | * | 9/1988 | Leo et al. | 138/128 |
| 5,006,185 | A | * | 4/1991 | Anthony et al. | 138/151 |
| 5,123,453 | A | * | 6/1992 | Robbins | 138/149 |
| 5,690,147 | A | * | 11/1997 | Cridland et al. | 138/147 |
| 5,727,599 | A | * | 3/1998 | Fisher et al. | 138/110 |
| 5,934,337 | A | * | 8/1999 | Fiala et al. | 138/149 |
| RE37,279 | E | * | 7/2001 | Fisher et al. | 138/110 |

FOREIGN PATENT DOCUMENTS

JP           53-83151     *  7/1978    ................. 138/156

* cited by examiner

*Primary Examiner*—Patrick Brinson
(74) *Attorney, Agent, or Firm*—Tarolli, Sundheim, Covell, Tummino & Szabo L.L.P.

(57) ABSTRACT

A pipe insulation jacket comprises two jacket members that can be joined to form a hollow cylinder. Both jacket members are made of a dimensionally stable, thermally insulating material. Both jacket members are provided with an elastic coating layer extending over the inner surface and over one of the radially extending end faces of the jacket members. The outer surfaces of the two jacket members are covered by a common tape linking the jacket members at one side in such a way that they can be spread apart at the other to such an extent that the insulation jacket can be radially moved onto the pipe to be insulated. The tape extends over the jacket member at the side where the two jacket members are spread apart, and its inner side is provided with an adhesive layer to interconnect the two jacket members once the pipe is enclosed.

10 Claims, 1 Drawing Sheet

PIPE INSULATION JACKET

BACKGROUND OF THE INVENTION

The present invention refers to a pipe insulation jacket, comprising a first jacket member having the shape of a semi hollow cylinder and a second jacket member having the shape of a semi hollow cylinder. Both jacket members have substantially identical cross sectional shape and can be joined to form a hollow cylinder thereby enclosing a pipe to be insulated.

Suspending or supporting thermally insulated pipes presents problems due to the fact that conventional insulators are not sufficiently strong for the brackets, by which the pipes are to be suspended or supported, to be attached to them. Therefore, pipe brackets are generally fixed directly to the pipe. This in turn requires additional insulation for the pipe brackets to prevent the formation of undesirable cold or heat bridges. It is obvious that providing additional insulation for pipe brackets is quite expensive.

PRIOR ART

A pipe insulator for suspension or support of a pipeline with cold insulation is known from the document EP 0 503 566. The pipe insulator mainly consists of two hollow cylindrical bush halves provided with an inserted ring segment of thermally insulated rigid cellular material resistant to pressure. This ring element extends over up to three quarters of the outside diameter of the matching cylindrical bush half. The outer skin of the pipe insulator is formed by a metal plate that at the same time forms the pipe bracket.

A fundamental disadvantage of pipe insulation elements provided with flexible portions and suitable for serving as suspension or support sections may be seen in the fact that they are resilient under the influence of exterior forces, occurring for example whenever metallic pipe brackets are used, usually leading to a compression of these flexible portions with the result that the pipe to be insulated is not supported or suspended as stably as would be desired.

OBJECTS OF THE INVENTION

Thus, it is an object of the invention to provide a pipe insulation jacket that ensures a safe and stable suspension or support of an insulated pipe, simultaneously having vibration-damping characteristics.

It is a further object of the present invention to provide a pipe insulation jacket that can be easily and inexpensively manufactured and that can be quickly attached to a pipe and handled without problems.

It is a still further object of the invention to provide a pipe insulation jacket that provides a good protection against humidity and/or steam penetrating into or escaping out of the insulation jacket.

SUMMARY OF THE INVENTION

In order to meet these and other objects, the invention provides a pipe insulation jacket comprising a first and a second jacket member, both made of a dimensionally stable, thermally insulating material having the shape of a semi hollow cylinder with a first radially extending end face, a second radially extending end face, an inner surface area and an outer surface.

Both jacket members have substantially identical cross sectional shape and are adapted to be joined to form a hollow cylinder thereby enclosing a pipe to be insulated. Thereby, the first end face of one jacket member faces the first end face of the other jacket member, and the second end face of the one jacket member faces the second end face of the other jacket member.

The inner surface area of the one jacket member, the inner surface area of the other jacket member, at least one of the first end faces of the one or the other jacket member, and at least one of the second end faces of the one or the other jacket member is provided with an elastic coating layer.

Due to the fact that both hollow cylindrical jacket members are made of a dimensionally stable material, a safe and stable suspension or support is ensured. The insulation jacket is compressed only minimally upon attaching a pipe bracket, in contrast to pipe insulation jackets provided with soft, resilient portions. The elastic coating layer provided on the inner surfaces of the hollow cylindrical jacket members acts as a vibration damping element; moreover, certain tolerances regarding the outside diameter of the pipe to be insulated can be compensated, such that no undesired gap arises between the hollow cylindrical jacket members and the pipe. Since the elastic coating layer extends also over at least one of the two adjoining end faces at both sides of the insulation jacket, it is ensured that the two adjoining end faces fully contact each other thereby providing an excellent protection from moisture and steam possibly penetrating the interior of the insulation jacket or escaping therefrom.

The pipe insulation jacket can be quickly and easily attached to a pipe to be insulated. For that purpose, the two hollow cylindrical jacket members are spread apart at one side to form a gap having at least a width corresponding to the outer diameter of the pipe, such that the insulation jacket can be radially pushed over the pipe.

In a preferred embodiment, the insulation jacket member of the invention comprises a tape common to both jacket members and covering both the outer surface area of the one jacket member and the outer surface area of the other jacket member. That tape links the two jacket members together at the side of the aforementioned second end faces of the two jacket members such that they can be spread apart from each other at the side of the first end faces to such an extent that the pipe insulation jacket can be radially moved onto the pipe to be insulated.

The tape comprises a tongue extending over the edge between the outer surface area and the first end face of one of the jacket members, whereby the surface of the tongue facing the outer surface area of the jacket member is provided with a self-adhesive layer to attach the tongue to the outside of the insulation jacket, bridging and sealing the previously created gap.

BRIEF DESCRIPTION OF THE DRAWINGS

In the following, an embodiment of the insulation jacket according to the invention will be further described, with reference to the accompanying drawings, in which.

DETAILED DESCRIPTION OF THE EMBODIMENT

Figure 1:
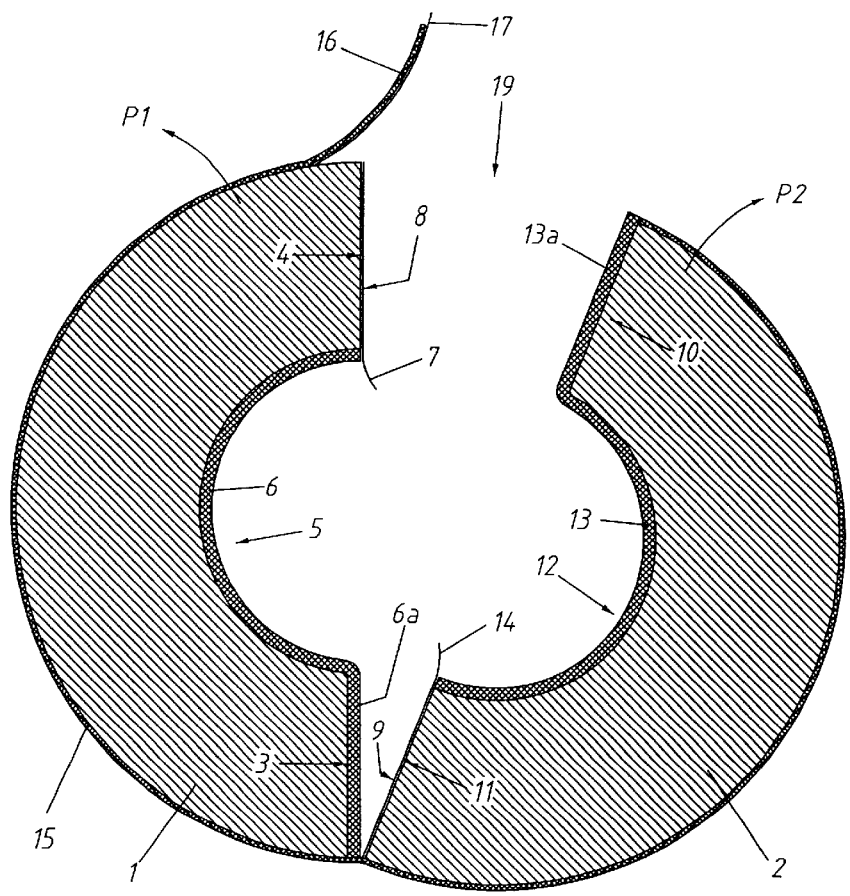
FIG. 1 shows a cross sectional view of the insulation jacket prior to applying it onto a pipe.

FIG. 1 shows a cross sectional view of the insulation jacket e.g. for thermally insulating a pipe, prior to applying it to the pipe. As can be seen in FIG. 1, the insulation jacket comprises a first jacket member 1 of hollow cylindrical configuration and a second jacket member 2 of hollow cylindrical configuration. The first and second jacket members 1, 2 are of dissymmetrically identical shape and are manufactured of a dimensionally stable, thermally insulating material, for example of a rigid foamed polyurethane material. Preferably, the outer surface of the jacket members 1, 2 is provided with a separate, smooth coating layer or an integral surface layer of smooth, not foamed polyurethane material.

The inner surface areas 5, 12 of the jacket members 1, 2 facing the outer surface of the pipe 20 (FIG. 2) are provided in each case with an elastic coating layer 6, 13 having vibration damping properties and being elastic in the direction of compression thereof. That coating layers 6, 13 extend not only over the inner surface areas 5, 12 of the jacket members 1, 2 facing the outer surface of the pipe 20, but also over the lower second end face 3 of the jacket member 1 as well as over the upper first end face 10 of the jacket member 2. These areas of the coating layers 6, 13 covering the end faces 3, 10 are designated with reference numerals 6a and 13a, respectively. The first end face 4 of the jacket member 1 and the second end face 11 of the jacket member 2 both are covered with a self-adhesive layer 8 and 9, respectively, whereby both self-adhesive layers 8, 9 are covered by a removable protection foil 7 and 14, respectively.

The outside of the two jacket members 1, 2 are provided with a common tape member 15 resistant against tensile forces, but elastically bendable. As can be seen in FIG. 1, the tape member 15 encloses the two jacket members 1, 2 forming the insulating jacket such that they are linked together, in the present example at the bottom, but can be spread apart at the opposite send, in the present example at the top, in the direction of the arrows P1 and P2, at least to such an extent that a gap 19 opens enabling the insulating jacket to be radially pushed over the pipe 20 to be insulated. The tape member 15 comprises a portion 16 in the shape of a tongue that extends over a few centimeters beyond the first end face 4 of the left jacket member 1 and over the gap 19 between the two jacket members 1, 2. The inner surface of the tongue 16 is provided with a self-adhesive layer covered by a removable protection foil 17. Preferably, both the tape member 15 as well as the elastic coating layers 6, 13 are made of a cellular synthetic caoutchouc having non-hygroscopic characteristic.

Figure 2:
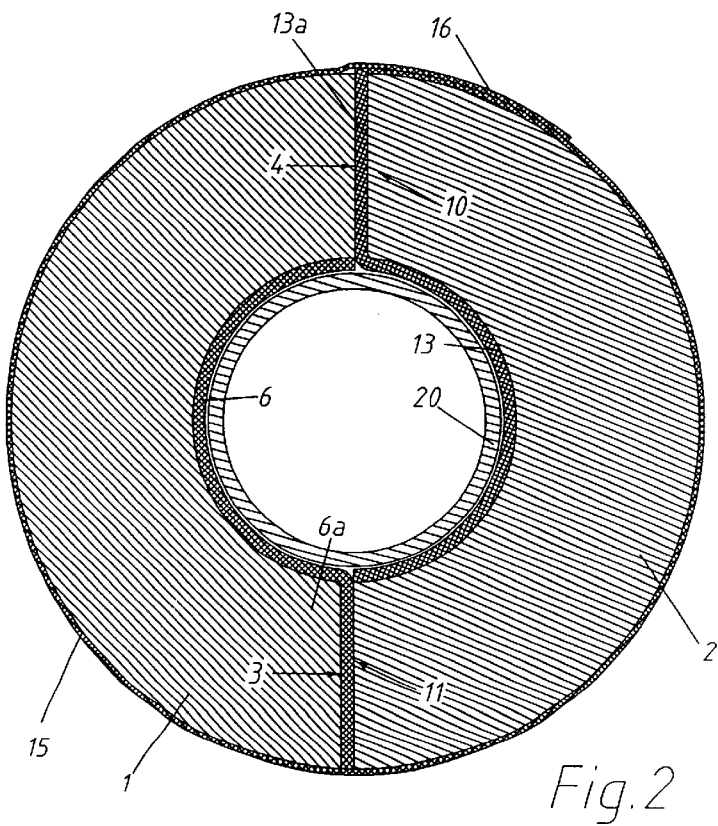
FIG. 2 shows a cross sectional view of the insulation jacket after having been applied onto a pipe.

Usually, the two protection foils 7, 14 covering the self-adhesive front faces 4, 11 are removed prior to applying the insulating jacket to the pipe 20, with the result that the two jacket members 1, 2 can be united by bonding them together at their end faces 3, 11 and 4, 10, respectively, to form a closed hollow cylindrical insulation jacket once they are in place over the pipe 20. Thereafter, the protection foil 17 covering the self-adhesive surface of the tongue 16 can be removed and fixed to the outside of the right jacket member 2. Thus, the tape member 15 extends over the now closed gap 19 and acts as a steam and humidity barrier. This situation is shown in FIG. 2.

For supporting or suspending a pipe provided with such an insulation jacket, usually metallic pipe straps or brackets are used (not shown in the drawings), enclosing the outer surface of the insulation jacket. By providing the outer tape member 15 and, particularly, by providing the inner elastic coating layers 6, 13, it is ensured that the pipe bracket is well insulated from the pipe 20 as far as vibrations are concerned. Thus, no vibrations can be transferred neither from the pipe 20 to the pipe bracket nor vice versa.

Since both jacket members 1, 2 are made of a dimensionally stable material, they are not deformed or compressed by the application of pipe brackets. Only the portions 6a, 13a of the elastic coating layer provided at the end faces 3 and 10 of the jacket members 1 and 2 are compressed under the influence of the clamping force exerted by a pipe bracket. However, such compression is welcome since the end faces 4, 10 and 3, 11, respectively, are holohedrally contacting each other and thereby provide a good protection from moisture penetrating into the interior of the insulation jacket. The lateral end faces of the jacket members 1, 2 are preferably sealed to prevent moisture from penetrating into the jacket material and to provide a smooth surface easing the application of glue to connect the insulation jacket with an adjoining one.

As a material for manufacturing both the elastic coating layers 6, 13 as well as the tape member 15, besides synthetic caoutchouc, also thermoplastic materials are suitable; fundamentally, both organic and inorganic materials can be used.

The embodiment of the insulation jacket according to the present invention and described herein before can be applied to a pipe very quickly and easily. Besides being a rigid support base for the pipe and besides its easy handling, the insulation jacket according to the invention provides the advantage of having vibration-damping characteristics. Moreover, it is able to compensate for certain inevitable tolerances of the outer diameter of the pipe to be insulated, and the penetration and escape, respectively, of steam and moisture is effectively avoided. Finally, the congruent design of the two jacket members 1, 2 favors an affordable manufacturing of the insulation jacket.

It is understood that the embodiment shown in the drawings and described herein before is not meant to limit the scope of the present invention. For example, another embodiment could be characterized by the fact that the elastic coating layers 6, 13 extend over both end faces 3, 4 and 10, 11, respectively. In still an-other embodiment, only one of the two jacket members 1, 2 could be provided with the afore mentioned elastic coating layer; in that case, the coating layer would extend over the inner surface area 12 and over both end faces 10, 11 of one of the jacket members 2, while it would extend just over the inner surface area and not over the end faces 3, 4 of the other jacket member 1. Important is, however, that at least one of two end faces 4, 10 and 3, 11 located opposite to each other is provided with the elastic coating layer 6a, 13a.

What is claimed is:

1. A pipe insulation jacket, comprising:
 a first jacket member means made of a dimensionally stable, thermally insulating material having the shape of a semi hollow cylinder with a first radially extending end face, a second radially extending end face, an inner surface area and an outer surface area; and
 a second jacket member means made of a dimensionally stable, thermally insulating material having the shape of a semi hollow cylinder with a first radially extending end face, a second radially extending end face, an inner surface area and an outer surface area;
 both said first and second jacket member means having substantially identical cross sectional shape and adapted to be joined to form a hollow cylinder thereby enclosing a pipe means to be insulated, whereby said first end face of said second jacket member means, and whereby said second end face of said first jacket member means faces said second end face of said second jacket member means;
 said inner surface area of said first jacket member means, said inner surface area of said second jacket member means, at least one of said first end face of said first jacket member means and said first end face of said second jacket member means, and at least one of said second end face of said first jacket member means and said second end face of said second jacket member means being provided with an elastic coating layer means;

said elastic coating on said inner surfaces of said first and second jacket member means engaging said pipe means.

2. A pipe insulation jacket according to claim 1, further comprising a tape means common to said first and second jacket member means and covering both said outer surface area of said first jacket member means and said outer surface area of said second jacket member means, said tape means linking said first and second jacket member means together at the side of said second end faces of said first and second jacket member means such that they can be spread apart from each other at the side of said first end faces of said first and second jacket member means to such an extent that the pipe insulation jacket can be radially moved onto the pipe to be insulated.

3. A pipe insulation jacket according to claim 2 in which said tape means comprises a tongue means extending over the edge between said outer surface area and said first end face of said first or second jacket member means, the surface of said tongue means facing said outer surface area of said first or second jacket member means being provided with a self-adhesive layer means.

4. A pipe insulation jacket according to claim 2 in which said tape means has high tensile strength, being however elastically flexible, and comprises a closed cellular structure.

5. A pipe insulation jacket according to claim 1 in which said elastic coating layer means comprises a closed cellular structure.

6. A pipe insulation jacket according to claim 1 in which said elastic coating layer means comprises vibration damping properties and has an elastic behavior when subjected to compression stress.

7. A pipe insulation jacket according to claim 1 in which said first and second jacket member means are made of a hard foam polyurethane material.

8. A pipe insulation jacket according to claim 2 in which said outer surface areas of said first and second jacket member means covered by said tape means are provided with a smooth surface means or comprise a non-foamed surface layer means.

9. A pipe insulation jacket according to claim 1 in which the lateral end faces of said first and second jacket member means are sealed.

10. A pipe insulation jacket, comprising:

a first jacket member means made of a dimensionally stable, thermally insulating material having the shape of a semi hollow cylinder with a first radially extending end face, a second radially extending end face, an inner surface area and an outer surface area; and a second jacket member means made of a dimensionally stable, thermally insulating material having the shape of a semi hollow cylinder with a first radially extending end face, a second radially extending end face, an inner surface area and an outer surface area;

both said first and second jacket member means having substantially identical cross sectional shape and adapted to be joined to form a hollow cylinder thereby enclosing a pipe means to be insulated, whereby said first end face of said second jacket member means, and whereby said second end face of said first jacket member means faces said second end face of said second jacket member means;

said inner surface area of said first jacket member means, said inner surface area of said second jacket member means, at least one of said first end face of said first jacket member means and said first end face of said second jacket member means, and at least one of said second end face of said first jacket member means and said second end face of said second jacket member means being provided with an elastic coating layer means;

said inner surface area and said second end face of said first jacket member means being provided with said elastic coating layer means, said first end face of said first jacket member means being provided with a self-adhesive layer means, said inner surface area and said first end face of said second jacket member means being provided with said elastic coating layer means, said second end face of said second jacket member means being provided with a self-adhesive layer means.

\* \* \* \* \*